(No Model.)
E. H. GOLD.
VALVE.
No. 491,166. Patented Feb. 7, 1893.
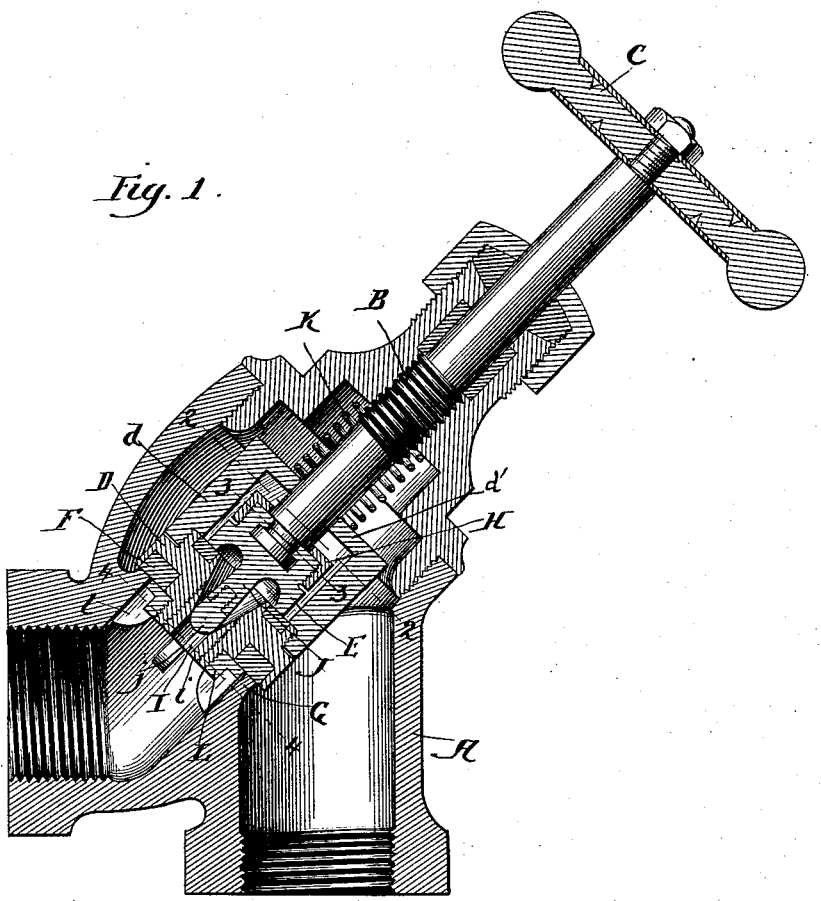
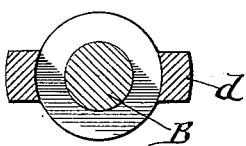
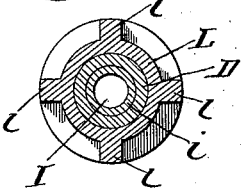
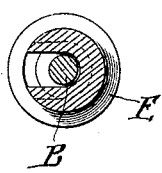
Witnesses:
O. R. Barnett.
Dodd Mason.
Inventor:
E. H. Gold
By Raymond & Veeder.
Attorneys.
THE NORRIS PETERS CO., PHOTO-LITHO., WASHINGTON, D. C.

UNITED STATES PATENT OFFICE.

EGBERT H. GOLD, OF CHICAGO, ILLINOIS.

VALVE.

SPECIFICATION forming part of Letters Patent No. 491,166, dated February 7, 1893.

Application filed April 18, 1892. Serial No. 429,569. (No model.)

*To all whom it may concern:*

Be it known that I, EGBERT H. GOLD, a citizen of the United States, residing at Chicago, in the county of Cook and State of Illinois, have invented certain new and useful Improvements in Valves, of which the following is a specification, reference being had to the accompanying drawings.

My invention is intended to provide a valve which will not be liable to cut and consequently will always be perfectly tight when closed and of which the capacity can be perfectly graduated from a very small flow to the full capacity of the pipe to which the valve is connected. It is well known that when the valve is only partially open so that a very small flow takes place through it, the rush of steam around the narrow orifice at the valve seat cuts out the valve and renders it leaky in time; this being more especially true if the valve seat is not made hard. If it is made hard and unyielding it is not so liable to cut, but its surface cannot be easily fitted with such accuracy as to insure tightness. In my improved valve, soft seats may be used without encountering the accompanying disadvantages of liability to cut.

In the accompanying drawings: Figure 1 is a central section of my improved valve. Figs. 2, 3 and 4 are sections of the valve proper on lines 2 2, 3 3 and 4 4 respectively of Fig. 1.

A is the valve case which may be made of any suitable form and construction.

B is the valve spindle which is threaded in the ordinary manner, and is provided with an operating hand-wheel C. At the lower end of the valve spindle are secured the valves D and E each valve being to a certain extent independent of the other. The outer valve D is preferably provided with a soft metal filling F and rests upon the seat G of the valve case. The connection of the part D to the valve spindle is through a yoke $d$ whose lower end is screwed to the valve and whose cross bar $d'$ surrounds the valve stem. The valve stem has a limited play endwise in said crossbar. The lower end of the valve stem is grooved as shown, and the upper part of the valve E is slotted to receive the head so formed upon the end of the stem. (See Fig. 3.) When in place a cap H is screwed upon the valve E and its detachment from the valve stem is thus prevented.

The valve E has its seat upon the back of the valve D and from this seat a tapered opening I extends through the valve D. Into this tapered opening projects a stud J secured to the bottom of the valve E, the size of said stud being such as to close the opening I when the valve E is seated. Above the yoke $d$ of the valve D is a spring K which serves to press the valve D upon its seat independently of the spindle B. The pressure upon the valve may assist the spring K if such pressure is on top of the valve, but if the pressure is beneath it, the spring K must be made strong enough to overcome such pressure. I prefer that the pressure should be above the valve as a rule. At the lower end of the valve D is a ring L seen in section in Fig. 4 having wings $l$ which serve as guides to the valve. The upper surface of the ring maintains the packing F of soft metal in place.

The operation of the valve is as follows: If it be desired to allow only a very small flow through the valve, the spindle B is partially turned. The valve E is thus lifted slightly from its seat. The amount which flows through the valve will be determined not by the area at the seat of the valve A, but by the area between the stud J and the taper opening I, this last mentioned area being much the smaller of the two. The opening around the stud J is less than the opening at the valve seat, not only because the diameter of the opening I is less below than at the valve seat, but the taper of the portion in which the stud J is fitted, is much more gradual than that at the valve seat even if the latter is beveled. Thus a given longitudinal movement of the valve stem will make a much wider opening at the valve seat than between the stud J and the orifice I. For this reason there will be no rush of steam at the seat of valve E and consequently no cutting action can take place at such seat. If it be desired to open the valve so as to permit a flow of the full capacity of the pipe, the spindle is withdrawn until the cap on valve E strikes the yoke of valve D, when the latter will be lifted and a full opening will be presented around the large valve seat. It will be seen that in this valve there are not the usual objections to having the pressure on the top of the valve, as there will be very little resistance to the opening of the valve and the flow through it can be perfectly controlled. I, therefore, prefer that the pressure should be on the top of the valve ordinarily, although, as before explained, the spring K may be made strong enough to resist any pressure to which the valve is subjected. It is obvious that where the pressure is on the top of the valve, the spring K is not essential to the working of the valve although it is in all cases desirable. Any cutting action which may take place in the valve, will take place at the end of the stud J or the portion of the orifice I which is immediately adjacent. For this reason, I make in some instances the stud J with a removable tip $j$ and provide a bushing $i$ for the lower part of the orifice I. It is not necessary to make the stud J and the orifice I a perfectly tight fit. The valves E and D are depended upon for preventing leakage when the valve is fully closed.

Without confining myself to the precise details herein shown and described, I claim:

1. The combination of a valve case provided with a valve seat; a valve adapted to seat itself thereon and having a tapered orifice extending through it; a second valve adapted to seat itself upon the first named valve and having a stud projecting into the tapered orifice I; and means adapted to first lift the smaller valve from its seat and afterward the larger valve, substantially as described.

2. The combination of a valve case provided with a valve seat; a valve adapted to seat itself thereon and having a tapered orifice extending through it; a spring adapted to hold said valve upon its seat; a second valve adapted to seat itself upon the first named valve and having a stud projecting into the tapered orifice I; and a valve spindle adapted to first lift the smaller valve from its seat and by its continued movement to lift the larger valve, substantially as described.

3. The combination of a valve case provided with a valve seat; a valve adapted to seat itself thereon and having a tapered orifice extending through it; a spring adapted to hold said valve upon its seat; a second valve adapted to seat itself upon the first named valve and having a stud provided with a removable tip projecting into the tapered orifice I; and a valve spindle adapted to first lift the smaller valve from its seat and by its continued movement to lift the larger valve, substantially as described.

EGBERT H. GOLD.

Witnesses:
 TODD MASON,
 O. R. BARNETT.